April 26, 1955 J. H. GISKES ET AL 2,707,101

PAPER FEED MECHANISM FOR TAPE PRINTERS

Filed July 1, 1952 2 Sheets-Sheet 1

INVENTORS:
JOHANNES HERMANUS GISKES &
CORNELIS SEGAAR.
BY Hugh A. Kirk
ATTY.

April 26, 1955 J. H. GISKES ET AL 2,707,101

PAPER FEED MECHANISM FOR TAPE PRINTERS

Filed July 1, 1952 2 Sheets-Sheet 2

INVENTORS:
JOHANNES HERMANUS GISKES &
CORNELIS SEGAAR.
BY Hugh A. Kirk
ATTY.

United States Patent Office 2,707,101
Patented Apr. 26, 1955

2,707,101

PAPER FEED MECHANISM FOR TAPE PRINTERS

Johannes Hermanus Giskes, Delft, and Cornelis Segaar, The Hague, Netherlands, assignors to Staatsbedrijf der Posterijen, Telegrafie en Telefonie, The Hague, Netherlands

Application July 1, 1952, Serial No. 296,628

4 Claims. (Cl. 271—2.5)

This invention relates to a strip material feeder mechanism. More particularly, it deals with such a feeder mechanism for paper tapes through a telegraph printer machine, including both gummed and plain paper tapes, which tapes may be first drawn from a reel, loosely fed to the operating station of the machine, such as the place where the tape is printed, and then positively withdrawn and pulled through said operating station.

Previously, such tape feeders for telegraph printing machines, such as for example the Markrum-Kleinschmidt and the Lorenz tape printers, pulled the tape from a reel over the surface of a platen roller or wheel, against which platen the tape was printed. The tape in this machine was held frictionally against the platen by a pressure roller which under undesirable weather conditions often caused the gummed side of the tape to stick to the platen roller. Furthermore, the angle at which the tape was fed to the roller was not always exactly in line with the circumference of the roller and as a result the tape often printed unevenly and sometimes would run off the platen entirely. Since only one tape feeding device, namely a pressure roller pressing the tape against a driven platen, was employed for pulling the tape from the reel and through the operating or printing station, any unevenness or sticking of the tape on the reel or before the tape was printed, might cause the tape to break after it had passed the printing station, so that no alarm signal would be given that new tape was not thereafter being fed from the reel. Furthermore, such pulling on the tape caused increased wear on the bearings of the tape feeding mechanism, as well as stretching of the tape so that overlapping of the signals printed on the tape might occur.

It is an object of the present invention to produce a simple, efficient, effective and economic tape feeding mechanism which overcomes the above disadvantages of the previously described strip feeding mechanisms and produces a substantially faultless feed of strip material through an operating station of the machine.

Another object is to provide a tape feeding mechanism for teleprinters having a platen roller in which the tape is maintained spaced from the platen roller except when it is printed.

Another object is to provide such a tape feeder having positive guide channels for feeding the tape both to and from an operating station of the machine.

Another object is to provide a tape feeder which both positively feeds tape from a reel to its operating station as well as pulls the tape through and from that operating station, whereby the tape is not unduly tensioned in the operating station.

Another object is to provide a reciprocating tape feeding mechanism for an operating station of a machine which provides a loose loop for the tape to be pulled through the operating stage by a second feeding mechanism through the operating station, whereby the second feeding mechanism merely pulls against the loose loop and any tape remaining in the loop not pulled through, is taken up again by the first feeding mechanism, so that the feeding loop will not become greater in size than that necessary for each operation of the second feeding mechanism.

Another object is to provide such a tape feeding mechanism for a teleprinter which maintains an even space on the tape between the printed signals and includes means for indicating when the paper is broken before it enters its printing station, so that no loss of printed signals will occur, when no tape is present to be printed, such as when it has been broken or it has run out.

Another object is to provide a feeding mechanism in which the bearings of the mechanism are not overloaded due to the tensioning of the tape fed by the mechanism.

Another object is to produce such a tape feeding mechanism wherein the possibilities of internal dislocation and damage of the tape are materially reduced from that of known tape feeding mechanisms.

Generally speaking, the tape feeding mechanism of this invention comprises two separate feeding devices, one of which intermittently feeds the tape from a reel or supply thereof to an operating station of a machine, such as the printing station over a platen, and the other feeding device alternately pulls the tape through the operating station at regular equal intervals after each operation on the tape. The first feeding mechanism may operate intermittently with that of the second feeding mechanism and may be driven from a common power source.

The first feeding device herein comprises a substantially one-way feeding jaw in which the tape may be positively fed forwardly with a force up to and beyond the breaking or tearing strength of the tape, but will permit the tape to be easily pulled through the jaw when being pulled in the feeding direction. However, the jaw always clamps the tape sufficiently to take up any slack in the tape thus already fed when the reciprocating feeding jaw is moved in the opposite direction from its feeding direction. This jaw accordingly may comprise a weighted jaw lever in which only the weight of the lever clamps the tape on its return from feeding stroke, but having the tape fed through the jaw at an angle overlapping the edge of the lever so that the tension in the tape causes the jaw to grab the tape more firmly in feeding it in its feeding direction. Thus, with such a mechanism, if the tape ever breaks because its reel became stuck or there is some irregularity in the tape itself, it will be broken by the first feeding device prior to the operating station along the tape, so that an alarm mechanism provided just before the operating station and after the first feeding device may detect the absence of the tape to give an indication and shut off the machine, such as a teleprinter so that none of the signals will be lost.

The strip material or tape from its source of supply, such as a reel, may be fed through a fixed guide of definite thickness to insure proper feeding of the tape through the first feeding mechanism, and then another guide may be provided for passing the tape through the operating station so that the tape, in the case of a teleprinter may never become stuck to the printing platen.

The second feeding device may comprise a pair of spring engaged pressure rollers between which the edges of the tape may be clamped. This second feeding device may be positioned along and in the guide leading from the operating station, which guide also may be provided with special means to prevent the tape from being picked up by the feeding rollers. These feeding rollers, however, may be knurled and preferably are of a relatively small diameter so as to have as little bearing contact with the tape as possible to prevent the tape from sticking to them.

The above mentioned and other features and objects of this invention and the manner of attaining them are given more specific disclosure in the following description of an embodiment of the invention taken in conjunction with the accompanying drawing, wherein:

Fig. 1 is a perspective view of those parts of an automatic teleprinter which cooperates with the movement of the paper tape through the device including a part of the reel, guides for the tape, both tape feeding devices according to the present invention, a platen wheel against which the signals are printed on the tape, and an alarm device for indicating the absence of the tape before it enters the printing station;

*The tape supply*

Figures 1, 2:
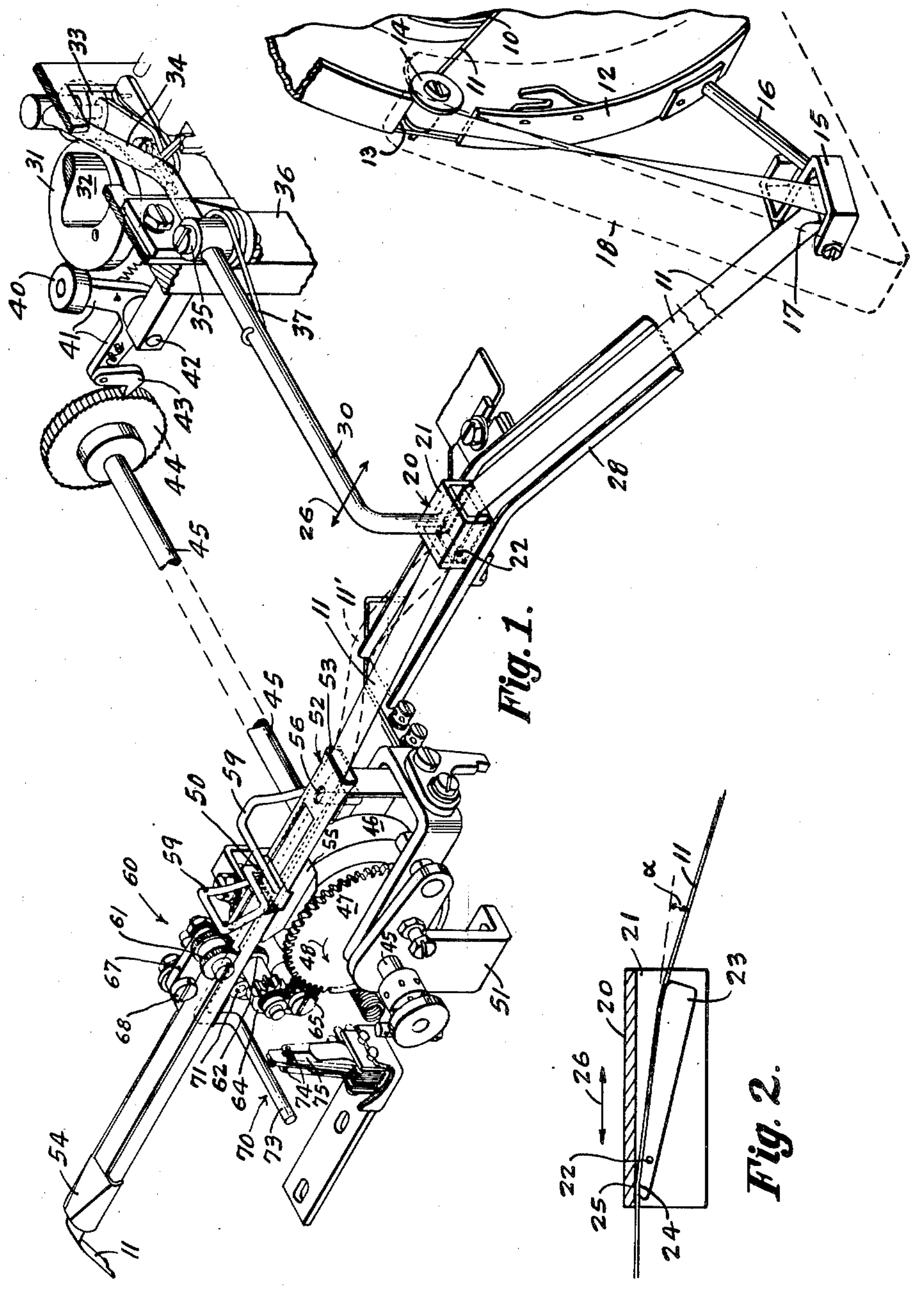
Fig. 2 is an enlarged sectional view of the jaw mechanism of the first feeding device showing a portion of the paper tape being clamped therein.

Referring first to the right of Fig. 1, there is shown a portion of a reel 10 of the paper tape 11 which may be fed from the reel housing or container 12 through a slot 13 in its periphery over an idler guide roller 14. This roller 14 may have a flange which keeps the tape 11 on the roller 14 as it is twisted at right angles to pass through a rigidly fixed guide 15 anchored on an arm 16 which may be mounted on the housing 12. This guide 15 may be provided with a slot 17, which slot preferably is sufficiently narrow to remove any dust or projections which may occur on the tape 11, which might affect the proper operation of the first feeding mechanism, and/or cause the tape to break in case it would not pass through the first feeding mechanism. If desired, this guide mechanism 15 together with its support may be protected by an additional housing 18, shown in dotted lines.

*The first or reciprocating tape feeding device*

The tape 11 is now fed upwardly at an angle into the open end of the first reciprocating feeding device 20. This feeding device may comprise an inverted U-shape channel member 21 across one end of which may be provided a fulcrum shaft 22 (see Fig. 2) upon which shaft may be loosely pivoted a weighted lever member 23 between its ends, having at its shorter end a jaw engaging face 24 which engages the forward under edge of the channel member 25. Thus the tape 11 is fed over the top of the lever 23 and the weight of the longer end of the lever clamps the tape between the two jaw faces 24 and 25, so that regardless of which direction the feeding device 20 is oscillated, according to the double headed arrow 26 in Figs. 1 and 2, the tape will always be slightly held, but may be permitted to slip through the jaw toward the left when the device 20 is moved toward the right because the tape is held in the operating station 50 and/or pulled by the second feeding device 60 described later. This grip of the tape only by weight of the lever 23 is sufficient so that if a loop 11' occurs in the tape between the first feeding device and the operating station 50, the slack or loop in the tape will be taken up when the device 20 reciprocates or moves towards the right. The tape 11, however, is firmly gripped between the jaw faces 24 and 25 by the tension in the tape 11 extending between the feeding device 20 and the reel 10 caused by the friction of rotating the reel 10 and passing through guides 14 and 15, when the device 20 is moved toward the left, in that the tape 11 is fed at an angle $\alpha$ of at least 30° which pulls downwardly over the longer end of the lever 23. This tension in this first section of the tape 11 aids the weight of the lever 23 increasing the grip on the tape with increase of said tension, thereby insuring a definite and positive feeding of the tape 11 from the reel 10 over the guide roller 14 and through the slot 17 to form a loose loop 11' between the operating station 50 and the first feeding device 20 for the feeding of the second feeding device 60. The clamping action on the tape when being fed towards the operating station 50, or being fed towards the left in Figs. 1 and 2, is sufficiently positive to break the tape 11 in the event any jamming occurs in the reel 10, guides 14 and 15, or slot 17.

Beneath the reciprocating first feeding device 20 there may be provided a fixed trough 28 both for guiding the tape at an angle upwardly into the feeding mechanism 20, and also for longitudinally guiding the feeding device 20 which may be pivotally mounted on the end of its operating lever 30. Thus, as the first feeding device 20 moves towards the left it pulls tape from the reel 10 and feeds it towards the operating station 50 an amount corresponding to the length of the stroke of its operating lever 30, and permits the tape 11 to slide through the feeding device on its motion in the other direction, provided there is not a loose loop of tape between it and the operating station 50, which has not been used up by the pulling of the second feeding device 60 on the other side of the operating station 50.

The operation of the lever 30 may be controlled by the rotation of an eccentric cam 31 mounted on a main drive shaft 32 of the machine or teleprinter. This cam 31 may operate a cam follower or roller 33 mounted on the opposite end 34 of the lever 30 from the feeding device 20, which lever 30 may have a fulcrum at a pivot 35 mounted on a fixed support 36 in the machine. A helical spring 37 may be provided engaging the lever 30 and the fixed pivot 35 to insure the cam follower 33 to always remain in contact with the cam 31.

On the opposite side of the cam 31, there may be provided means for operating the second feeding device 60, by means of a second cam follower or roller 40 which may be connected to one end of a bell crank lever 41, pivoted on a fixed shaft 42, which bell crank lever 41 operates a pivoted pawl 43 on its other end, that engages a ratchet wheel 44 for intermittently rotating a drive shaft 45 for a platen wheel 46, and the second feeding device drive gear 47 in the rotation of the arrow 48. Since the cam follower 40 is on the opposite side of the same eccentric cam 31 as cam follower 33, the operations or reciprocations of the first feeding device 20 alternate with those of the second feeding device 60. Since the platen wheel 46 of the printer herein is shown mounted on the shaft 45, it rotates also intermittently so that the same peripheral portion of the platen wheel 46 will not receive two successive printing pressures and the possibility of the tape sticking to the platen will also be reduced.

*The tape guide channel*

Figures 3, 4:
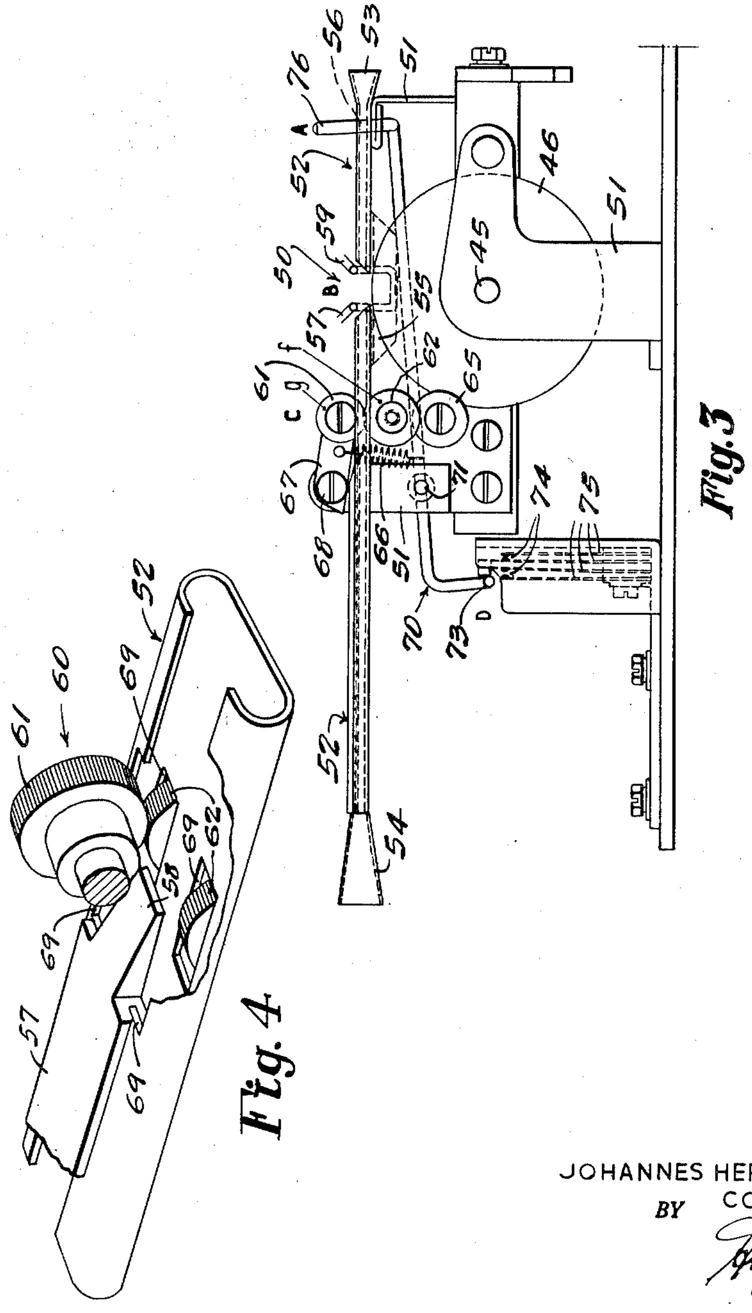
Fig. 3 is an enlarged side view of a portion of Fig. 1 showing the operating or printing station, a second feeding device and the alarm device in its operated position because no tape is present in the operating station.
Fig. 4 is an enlarged perspective view of a part of the second feeding device and its surrounding guide means for the tape with parts thereof broken away.

A bracket 51 may be provided for supporting the shaft 45 which frame assembly may also be used to support guide channel 52 which substantially surrounds the tape on both sides of the operating stage 50. Referring now also to Fig. 4, the guiding channel 52 is shown to have at least a C-shaped cross section to prevent sideways as well as up and down movement of the tape as it is fed over the platen wheel 46. This guide 52 may also be provided with funnel shaped ends 53 and 54, and may be bridged together only by side members 55 around the operating station 50, so as to permit the printing type or operating mechanism freely to press the tape 11 as it passes the station 50 against the top surface of the platen 46. Thus, the guide channel 52 prevents the tape 11 from normally touching the top of the platen wheel 46 thereby further preventing it from being stuck thereon, particularly if the tape is a gummed tape and the weather is humid. Near the funnel open end 53 of the guide 52, there may be provided a central aperture 56 passing completely through the guide 52, to which a feeler of the alarm device, described later, may penetrate to detect if there is a tape in the guide which may be fed to the operating station 50. Following the operation station 50, the top of the guide channel 52 may be bridged by a member 57 (see Fig. 4) which may have a wedge shaped projecting forward end 58, which extends substantially between the gripping rollers 61 and 62 of the second feeding device 60, and thereby prevents the tape from being wound up on these rollers, and thereby further maintains the tape in its proper guide channel 52.

On either side of the operating station 50 there may be provided guide bars 59 for guiding the ends of the printing type arms of the teleprinter (not shown), to cooperate with the tape and press the tape against the top of the platen 46 only at the station 50.

*A second or roller tape feeding device*

Referring to Figs. 1, 3 and 4 there is shown also mounted on the frame assembly 51, a second feeding device 60 which may comprise a pair of edge serrated or knurled rollers 61 and 62, the latter one of which may be positively driven by a gear 64 through an idler gear 65 meshing with the drive gear 47 mounted on the shaft 45. The former serrated roller 61 may be maintained in engagement downwardly against the cooperating serrated portions of the roller 62, by means of a spring 66 connected to a lever 67 pivoted at one end on a pin 68, at the other end of which lever 67 the roller 61 is freely mounted. Thus, as the shaft 45 and gear wheel 47 are intermittently rotated, the feeding roller 62 is similarly intermittently rotated to feed substantially equal lengths of the tape 11, clamped at its edges between the serrated portions of the rollers 61 and 62, through the operating station 50 of the printing device. The positive drive of the printing mechanism thus easily permits the equal length portions of the tape to be successively fed from the loose loop 11' of tape 11 already provided before the guide opening 53 by the reciprocating feeding device 20, so that substantially no tension occurs in the tape between the two feeding devices 20 and 60, no overloading of the bearings of the platen, and no overlap of the signals printed on the tape.

The guide channel 52 (see Fig. 4) may be provided with opposing pairs of slots 69 through which the knurled engaging portions of the feeding rollers 61 and 62 may protrude for engaging the tape 11 between them and further prevent the tape from becoming stuck or wrapped around these rollers.

*The alarm mechanism*

Also on the frame assembly 51 (see Figs. 1 and 2) may be mounted an alarm lever arm 70 with its fulcrum at a fixed pivot 71, one end of which lever arm 70 may be provided with a feeler or finger 76 which may project through the aperture 56 when no tape is in the guide 52 at this point. The spring 66 for operating the roller 61 may also be employed for urging the feeler 76 up through the aperture 56, by connecting it between the lever 67 and the lever 70 as shown in Fig. 3. However, the respective lengths of the lever arms for these connections of spring 66 to the pivots 68 and 71 should be materially different so that the finger 76 does not press against the bottom of the tape 11 with sufficient force to puncture the tape, but only with sufficient force, when the tape is not over the aperture 56, to move the lever arm 70 into the position shown in Fig. 3 and cause its opposite end 73 to operate the two pairs of electric contacts 74, shown mounted on leaf springs 75. These contacts 74 may be connected to simultaneously stop the teleprinter or operating mechanism at 50, as well as close a circuit for giving an alarm, which may be either audible or visual, or both.

In view of the foregoing it can be seen that the feeding mechanism of this invention first intermittently pulls the tape from its magazine or reel 10 by means of a first reciprocating device 20, and then as a loose loop or portion 11' of the tape is prepared before the operating station 50, the second feeding device pulls a given length or section of the tape through the operating station 50 after each operation on the tape at that station. Accordingly, a regularly printed tape 11 is discharged from the end of the guide 54 and continued regular and faultless operation of the feeding of the tape through the mechanism is provided regardless of whether the tape is gummed or not, or of weather conditions.

While there is described above the principles of this invention in connection with specific apparatus, it is to be clearly understood that this description is made only by way of example and not as a limitation to the scope of this invention.

What is claimed is:

1. An intermittent flexible strip feeding mechanism comprising: means for reciprocating said mechanism along a given line, and means for removing said flexible strip from said mechanism along said line in an amount less than said reciprocating mechanism that feeds thereto, said mechanism comprising: a relatively fixed jaw and a relatively movable jaw which cooperate to clamp said flexible strip between them more securely during one direction of reciprocation than during the other, said movable jaw comprising a lever pivoted intermediate its ends and being biased to continuously engage said strip, one end of said lever cooperating with said fixed jaw, means for introducing said flexible strip at an angle to said other end of said lever, whereby tension in said flexible strip being introduced presses on said other end of said lever to increase the clamping of said flexible strip between said jaws when said jaws are being moved in said one direction.

2. A mechanism according to claim 1 wherein said means for removing said flexible strip comprises a pair of spring engaging rollers between which rollers said flexible strip is fed.

3. A mechanism according to claim 1 including a common driving means for alternately operating said reciprocating feeding mechanism and said means for removing said flexible strip.

4. A mechanism according to claim 1 wherein said line is horizontal and said angle for introducing said flexible strip is below said horizontal, and wherein said biased lever is weighted at said other end.

References Cited in the file of this patent

UNITED STATES PATENTS

| | | |
|---|---|---|
| 446,522 | Huth et al. | Feb. 17, 1891 |
| 950,754 | Oehring | Mar. 1, 1910 |
| 954,751 | Mann | Apr. 12, 1910 |
| 1,297,587 | Nordstrom | Mar. 18, 1919 |
| 1,506,335 | Brown | Aug. 26, 1924 |
| 1,916,845 | Leland | July 4, 1933 |
| 2,016,462 | Stokes | Oct. 8, 1935 |
| 2,169,058 | Price | Aug. 8, 1939 |
| 2,250,530 | Hafecost | July 29, 1941 |
| 2,250,677 | Paulsen | July 29, 1941 |
| 2,352,445 | Pinckney | June 27, 1944 |
| 2,388,423 | Langdon | Nov. 6, 1945 |
| 2,400,776 | Nordeen et al. | May 21, 1946 |